United States Patent [19]
Sarka

[11] 3,891,437
[45] June 24, 1975

[54] METHOD OF MAKING CUTTING AND SCORING DIES

[75] Inventor: Albert J. Sarka, Cleveland, Ohio

[73] Assignee: Harris-Intertype Corporation, Cleveland, Ohio

[22] Filed: Dec. 22, 1972

[21] Appl. No.: 317,614

Related U.S. Application Data

[63] Continuation-in-part of Ser. No. 159,961, July 6, 1971, abandoned.

[52] U.S. Cl. .................... 96/36.3; 156/12; 156/14
[51] Int. Cl. ........................... G03f 7/00; C23f 1/02
[58] Field of Search ............ 156/12, 2, 7, 8, 14, 58, 156/62; 96/27 R, 27 E, 36, 36.3, 44

[56] References Cited
UNITED STATES PATENTS
2,999,016   9/1961   Beeber et al. .......................... 96/75

Primary Examiner—William A. Powell
Assistant Examiner—Brian J. Leitten

[57] ABSTRACT

A method of providing a parallel-sided, accurate-width linear land on the surface of a chemically-etchable homogeneous metallic member wherein the areas on each side of the land are to be etched downwardly in a manner and to a depth which inherently results in side-etching. The method utilizes a thin transparent backing sheet with an opaque scribbable surface thereon which is scribed to provide a thin line in the shape of the land to produce a first transparency. That scribed-transparency is placed in contact with an unexposed film sheet and the film sheet is exposed while relatively moving the first transparency and film sheet to produce a second transparency having an exposed area which is substantially identical in shape to the scribed line on the first transparency but having a wider dimension, the amount of relative movement being predetermined and a function of the relative side-etching which would result from achieving the desired etching depth below the surface of the metallic member. The planar surface on the metallic member is then coated with a light-hardenable sensitized coating material. Those areas of the coating corresponding with the exposed areas of the second transparency are exposed to light to harden those areas of the coating. After exposure, the unhardened coating material is removed from the surface, and the member is chemically etched.

11 Claims, 6 Drawing Figures

PATENTED JUN 24 1975 3,891,437

SHEET 1 ent invention is a continuation-in-part of my
METHOD OF MAKING CUTTING AND SCORING DIES The present invention is a continuation-in-part of my copending application Ser. No. 159,961, entitled "Method of Making Die Plates," filed July 6, 1971, now abandoned, and assigned to the assignee of the present invention.

The present invention relates to a method of making die plate having lands thereon which project from the main body of the die plate and which form material, and in particular the present invention relates to the manufacture of die plates which effect a cutting and/or creasing of sheet-like material by the lands formed thereon.

Die plates which are used for purposes of cutting and/or creasing sheet-like material are known. Downie U.S. Pat. No. 3,170,342 discloses such cutting and creasing die plates. The die plates disclosed in the Downie patent are made of a homogenous material and include a base with projecting lands which extend therefrom. For purposes of creasing, one of the die plates (the female die) has a pair of closely spaced lands, whereas the other die plate (the male die) has a single land which forces material into the space between the lands on the female die to effect a creasing thereof. The cutting is effected by cutting lands which extend from the die plates and have an overlapping area in the plane of the material along the line of severance. The cutting lands effect a rupturing of the material and their operation has been termed "rupture cutting," since the lands do not touch during the cutting operation.

The lands are formed on the die plates by an etching or chemical milling process. More specifically, a light-hardenable resist coating is placed on metal plates and the resist coating is exposed to a pattern of light in dependence on the lands to be formed to harden certain areas of the resist which are to form the lands. Then the plate is etched in the unhardened areas so that the lands are formed. The resist coating is exposed through a transparency such as a positive or negative having light-transmitting lines or areas which determine the areas of the resist which are hardened. It should be obvious that it is extremely important that the transparency or negative be accurately made.

My copending application Ser. No. 159,961, now abandoned, assigned to the assignee of the present invention, is directed to a method of making the die plates and which is less susceptible of inaccuracy occurring therein than prior known techniques. The method disclosed therein is extremely efficient and when used substantially increases the accuracy of die plates made by previously known techniques.

The method in the afore-mentioned application Ser. No. 159,961, now abandoned involves the use of a scribe-coat material which has a transparent mylar backing with an opaque scribable coating thereon. The scribable coating is scribed on a computer controlled drafting machine in order to provide a pattern thereon corresponding with the pattern to be cut by the die plates. One of the problems uncovered during the use of that process centered on the width of the milling cutter. If a wide rotary milling cutter was used on the computer drafting machine, a properly scribed line was not formed in the scribe material uniformly at all times. Two problems were involved in the failure of the drafting machine to provide a sharp line. Frequently, the cutter, particularly a wide rotary milling cutter, which was used in the drafting machine would not engage the scribecoat material properly. This was caused due to difficulty in having the scribecoat film material lie perfectly flat. If the cutter did not engage deep enough, a sharp line was not provided and all of the coating was not removed from the transparent mylar backing. If the cutter engaged too deeply through the coating on the mylar, the mylar material would be damaged or scuffed which would affect the optical properties of the mylar, and therefore affect the negative or positive which was made from the scribecoat material. One suggested solution to the problem was to utilize thick sheets of glass having a scribecoat coating thereon, and scribing the coating. This solved the problem of the material lying flat but was quite expensive and provided shipping problems.

It has now been found, however, that the problems of making a sharp, clear properly defined line in the scribable film material can be minimized by using a very fine thickness scriber. When a thin scriber is used, an extremely sharp accurate-width line is provided on the mylar material, and the problems of the material lying flat are minimized. In order to obtain the thicker lines or areas necessary in the manufacture of the die plates from the thin, sharp scribe line, orbital contact exposure techniques are used. Through the orbital contact exposure technique, a transparency is made having a wider line layout than that which is scribed by the thin scriber on the drafting machine. The orbital exposure techniques involve orbiting or moving the narrow line scribecoat material relative to a film while in intimate contact therewith to obtain the desired thickness of exposure on the film and the film and scribe material are then further used in the process of manufacturing the die plates, much as disclosed in the afore-mentioned Sarka application Ser. No. 159,961, now abandoned.

Accordingly, the principal object of the present invention is the provision of a new and improved technique for the manufacture of die plates and where scribable material is used which may be scribed with a very thin scriber which solves the problems of providing a sharp line which have existed with wider scribers to thereby provide a simplified and more reliable technique for the accurate manufacture of the die plates. This substantial improvement is achieved by the present invention through the technique of orbital exposure of a thin line formed in the scribable material to form a wider line transparency.

Further objects, advantages and features of the present invention will be apparent to those skilled in the art to which it relates from the following detailed description of preferred embodiments thereof, which description is made with reference to the accompanying drawings in which.

Figure 1:
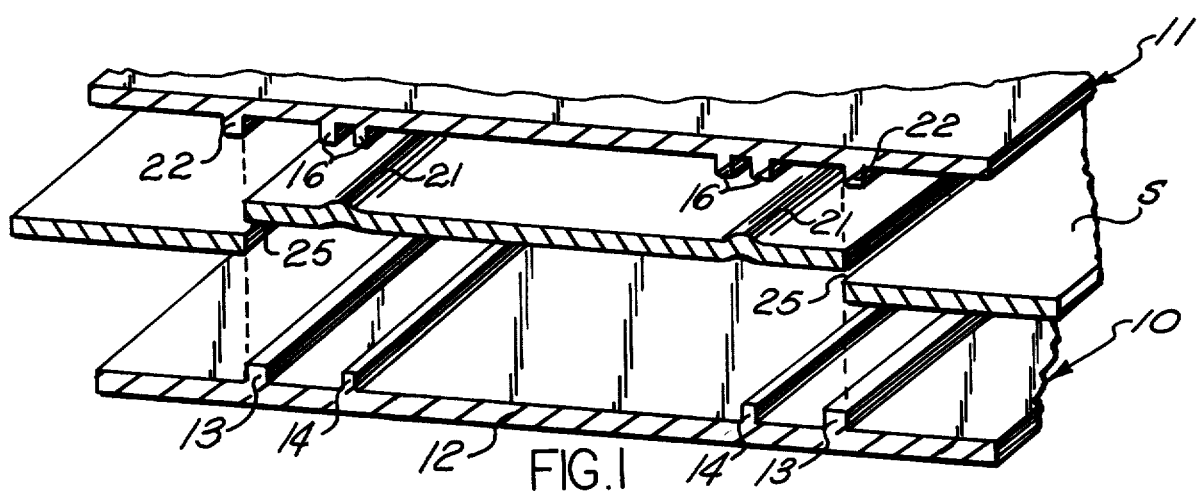
FIG. 1 is a schematic view of a pair of die plates manufactured by the technique disclosed herein and which also illustrates schematically the material on which the die plates operate.

Referring now to FIG. 1, a male die 10 is shown, as well as a female die 11 which cooperates with the male die 10 to cut and crease material S. Preferably, the dies 10, 11 are made of a one-piece homogeneous flexible metal material. The male die 10 includes a base portion 12 and projecting cutting lands 13 thereon. The male die 10 also has creasing lands 14 which project from the body 12. The female die 11 includes a pair of projecting land elements 16 which define a space therebetween into which the male element 14 forces material which is advanced between the dies and thereby effects a creasing or scoring of the material. The female die 11 also includes severing lands 22. Each severing land 22 cooperates with a severing land 13 on the male die 10 and effects a severing of the material in accordance with the afore-mentioned Downie patent, and the disclosure of the Downie patent is incorporated herein by reference.

The material S which is formed by the dies may take a variety of forms and commonly is a preprinted cardboard material which has cartons printed thereon. Crease lines, commonly referred to as scores, are illustrated at 21 in the material and cut or sever lines at 25. Preferably, the dies 10, 11 work on sheet material to form a plurality of carton blanks therefrom as is known.

Figure 2:
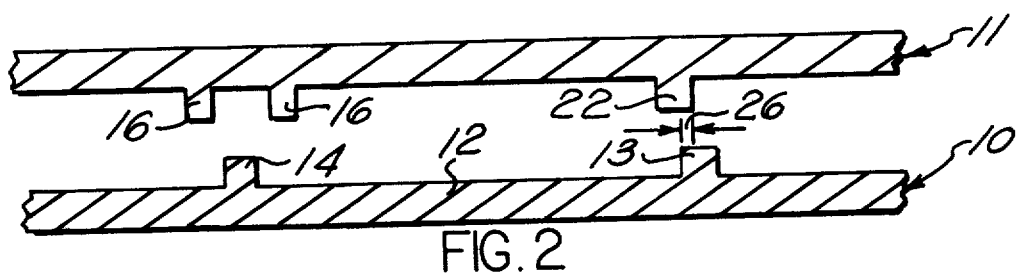
FIG. 2 is a cross-sectional view of the die plates illustrating structural features thereof.

FIG. 2 illustrates that the severing elements 13 on the male die plate and severing elements 22 on the female die plate have an overlapping portion in the plane of the material. The overlapping portion is designated 26 in FIG. 2. The severing elements are referred to in the art as effecting a "rupturing" of the material. The dies 10 and 11 move toward each other to operate on a sheet of paperboard. However, the severing elements do not come in contact with each other during the cutting of the material but rather remain slightly spaced apart and due to the overlapping area 26, effect a rupture cut of the material, as is known.

The dies 10, 11, while illustrated in FIGS. 1 and 2 in the flat, are preferably flexible and can be bent or curved. It should be understood, however, that the technology herein discussed is applicable also, with some modifications, to placing of the cutting and creasing lands directly onto a solid member, such as a cylinder. A common manner in which the dies 10, 11 are used is to mount the dies on cooperating rotary cylinders. Material in sheet form is then advanced through the nip defined by the cylinders and the cooperating lands on the dies effect the cutting and creasing of the material as it advances through the nip. The dies may be formed so that from a given sheet of material, a plurality of cartons are cut. It should be apparent, of course, from the description hereinabove that the lands on the die plates must be extremely accurately located so that they properly cooperate with each other so that the desired carbon blank is formed from the sheet material S.

The die plates 10 and 11 are made in dependence upon the carton to be cut thereby. The carton blank to be manufactured is designed by the appropriate carton designer, who makes a pattern layout of not only the outline of the carton, but also the score lines. The pattern is dictated by commercial aspects and the machinery which is to be used to fold the carton blank into the final carton. Accordingly, the pattern which is provided as the beginning of the operation or method for forming the male and female dies corresponds to the shape of the carton blank to be formed by the dies including the shape or position of the creasing lines on the blank, as well as the general outline shape of the blank to be formed by the dies. After the pattern is made, the pattern is used for purposes of putting input data into an automatic drafting machine so that the pattern can be reproduced by the drafting machine. The input data can be fed into the drafting machine in any suitable well-known manner. For example, appropriate measurements and dimensions may be taken from the pattern and stored in the automatic drafting machine. A conventional method of feeding the data corresponding with the pattern into the automatic drafting machine is the so-called and well-known digitizing process. Digitizing is a process which involves the movement of a scanner along the lines defining the pattern and the appropriate storage information is stored as the scanner moves. After the information is stored in the drafting machine, the drafting machine can then be utilized to reproduce the pattern or slight variations thereof, as will be described below. An alternate, and in some respects, a preferable approach is to write a computer program corresponding to the shape of the carton, and to have the drafting machine follow the program instructions.

Figure 3:
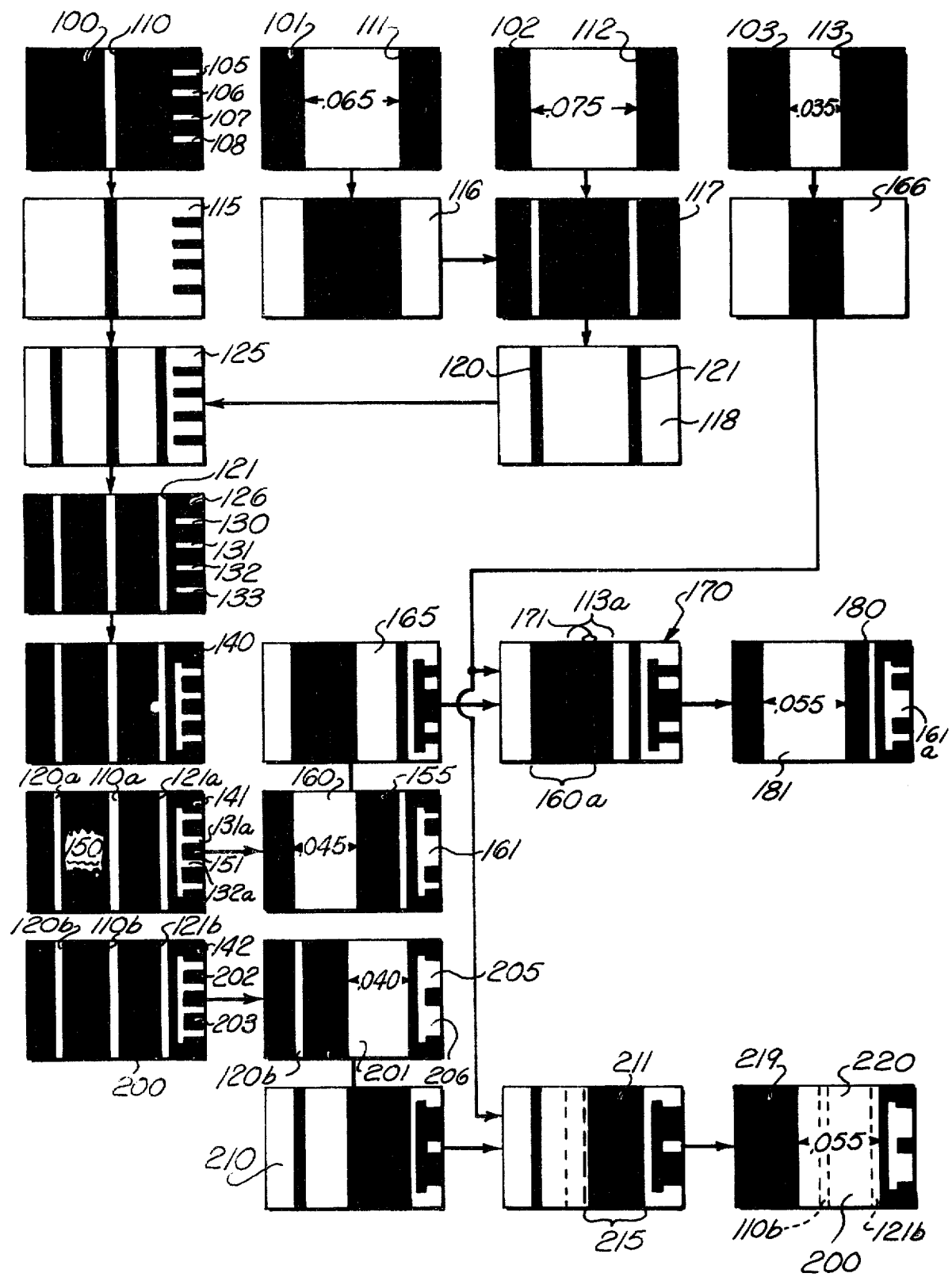
FIG. 3 is a schematic flow representation of one of the techniques which may be utilized in the manufacture of the die plates of FIGS. 1 and 2.

In copending application Ser. No. 159,961, now abandoned there is a detailed description of techniques for making the die plates from the designed carton blank utilizing the computer drafting machine. These techniques involve the use of scribe material and peel-coat material and the entire disclosure of that application is incorporated herein by reference. In one embodiment described in application Ser. No. 159,961, now abandoned four scribe-coat masters are formed on the automatic drafting machine by a scribing tool which removes the coating material on a mylar (transparent) base sheet. The four scribe-coat masters are designated 100, 101, 102 and 103 in FIG. 3. The scribe-coat sheets 100–103 are made on the drafting machine by scribing (removing) portions of the coating on the light-transmitting base sheet of the scribe-coat material. However, the width of the scriber which removes the material from the films 100–103 is varied, as should be apparent in the drawings and will be discussed below.

The scribe-coat material has its coating removed in accordance with the programmed outline of the carton blank. The master 100 specifically has one line 110 formed therein which has a width of 0.005 inches. This line is located on the film 100 centrally with respect to the outline of the carton which is to be formed in the sheet material. The film 100 also has four lines formed thereon designated 105–108.

The film 101 has a line 111 formed therein which has a 0.065 inch width. The film 102 is formed with a line 112 of 0.075 inch width. The film 103 is formed with a line 113 of 0.035 inch width. All of the lines 110–113 are produced from the same program.

After the four masters 100, 101, 102 and 103 are formed with the different width of lines thereon, the master 100 is used to produce a positive 115. Likewise, the film 101 is formed into a positive 116. The positive 116 is overlaid on the master 102 and suitable registry is provided therebetween, such as pin registry disclosed in U.S. Pat. No. 3,160,096. With the positive 116 overlaid on the film 102, the combination, designated 117, is exposed to form a positive 118. The positive 118 is provided with two lines thereon 120 and 121. Each of the lines is 0.005 inches in width. The positive 118 is then overlaid on and in registry with the positive 115 formed from the master 100. The combination thereof is designated 125. This combination is exposed to form a negative 126. The negative 126 then has three lines, designated 120, 110, 121, formed on it. Also, on the negative 126 are four lines which are designated 130, 131, 132 and 133, which are used to form the creasing lands. The negative 126 is then handworked, as described in the aforementioned Sarka copending application to form a handworked negative 140.

The handworked negative 140 is then exposed to form two Peel Coat negatives, which are designated 141 and 142. The two negatives 141, 142 are identical in construction, as should be apparent from FIG. 3. The negatives 141 and 142 are formed, in general, by a process involving the exposing of the Peel Coat material and the etching of a portion of the material which became sensitized to light which was transmitted through the negative 140. After the negatives 141, 142 have been formed, it should be apparent that they are provided with a plurality of lines corresponding to the lines which are on the negatives 126. For purposes of ease of description, the lines which are on the negative 126 are given the same designation as on the negative 141, but with an *a* appended, and the same lines are given the same designation on the negative 142 with a *b* appended. The negatives 141, 142 are then used and selected areas are removed therefrom for purposes of making the final die plates.

The negative 141 is used in the formation of the male die plate 10. The negative 141 has its area 150 (defined by 120*a* and 110*a*) peeled therefrom as well as the area 151 which is defined by the lines 131*a* and 132*a*. The peeled negative 141 is designated 155 in the drawings with the areas 151 and 150 peeled therefrom. The area 150 which has been peeled has a width of 0.030 inches, and, accordingly, the negative 155 is provided with a light-transmitting area, designated 160, which has a lateral dimension of 0.040 inches. The area 151 which has been peeled from the Peel Coat 141 provides a light-transmitting area 161 on the Peel Coat 155 which functions in forming a male land for creasing.

The negative 155 is then made into a positive which is designated 165. The positive, of course, has opaque lines which correspond with the light-transmitting lines of the material 155. The positive 165 is then precisely registered to the master 103 to form the final negative for purposes of making the male die 10. More specifically, the film 103 is first formed into a positive which is designated 166. The positive 166 is overlaid in register with the positive 165. This combination is designated 170 in FIG. 3. As a result of this overlay, the area bracketed and designated 113*a* corresponds with the area 113 of the master 103 and that area, as is noted is 0.035 inches. The area which is bracketed and designated 160*a* is the area which corresponds with the area 160 on the negative 155. The bracketed area 160*a* has a dimension of 0.040 inches. The area bracketed and designated 171 corresponds with the line 110 and is 0.005 inches in width.

The overlaid positives 165 and 166 are exposed to form the final negative 180 which is used in the formation of the male die 10. The negative 180 includes an area 181 which is light-transmitting and which has an area equal in width to 0.055 inches. The width of area 181 is equal to 0.040 inches (the width of 160) plus 0.0175 inches (½ the width of 113*a*) minus 0.0025 inches (½ the width of 110), as should be apparent. This, of course, is 0.055 inches.

The negative 180 is used in a "step and repeat" machine and a large film is exposed through the negative to form a single full size negative in accordance with the dies to be manufactured. The full size negative is then used to expose a resist coating on a metal plate to make the male die. The resist coating is applied to the metal plate and the light-transmitting areas effect a hardening of corresponding portions of the resist coating. The plate is then washed and the unhardened resist coating areas are removed. The die plate is then etched in the conventional manner in order to form the lands. The cutting lands 13 will be formed from the area 181 and the creasing lands 14 will be formed from the area 161*a*. In the embodiment shown, the creasing land, of course, will be much narrower than the cutting land.

The negative 142 is used in the formation of the female die. With respect to the negative 142, the area 200 defined by the lines 110*b* and 121*b* is removed to form a light-transmitting area 201. The area 201 has a dimension of 0.040 inches in the example shown. Also, the areas 202 and 203 are removed for purposes of forming the female creasing lands 16. As a result, the negative 142 has light-transmitting areas 201 of 0.040 inches, and the line 120*b* which is also a light-transmitting area, of 0.005 inches. Moreover, for purposes of forming the creasing lands, the negative 142 has light-transmitting areas 205 and 206.

The negative 142 is then formed into a positive which is designated 210 and which corresponds with the negative 142 except that the light-transmitting areas are now not light transmitting. The positive 210 is then combined with the positive 166, and this combination is designated generally 211 in FIG. 3. When the positives 166 and 210 are overlaid, the center of the positive 166 corresponds with the center of the line 110*b*, which line forms a part of the area designated 215 in FIG. 3. The portion of the area 215 which comprises the line 110*b* is bracketed and designated 211. The width of the area 215 is 0.040 inches.

When the overlaid positives 210 and 166 are exposed, a negative 219 is formed which has a light-transmitting area designated 220. The light-transmitting area 220 is made up of the thickness of the line 121*b* (0.005 inches), the width of the peeled area 200 (0.030 inches), the width of the line 110*b* (0.005 inches), the width of one-half of 113 (0.0175 inches), minus one-half of the width of the line 110*b* (0.0025 inches). Accordingly, the total width of the area is equal to 0.055 inches which is identical to the width of the area 181.

The negative 219 is also used in a step-and-repeat machine to form a full size negative. The full size negative is used to expose a light hardenable resist on a metal plate prior to etching of the metal plate. As described above, it is well known that the etchant provides a lateral narrowing (cutaway) of the lands as it etches the areas and, accordingly, the final lands do not have the dimensions of the areas 181 or 220, but rather have dimensioning which is less than that. Also, it is apparent that the etchant will act generally equally on the severing elements which are formed in each die, and accordingly the dies 10, 11 will have a precise overlapping area 26 (FIG. 2) for purposes of cutting. The creasing elements 14, 16 which are formed also are affected by the lateral etching which occurs. In fact, the lateral etching results in the areas corresponding to lines 130 and 133 being completely etched away.

Figure 4:
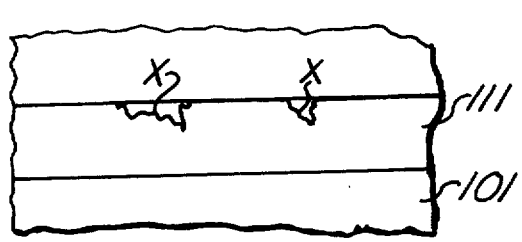
FIGS. 4 and 5 illustrate problems which have been encountered in the manufacture of die plates in accordance with prior techniques.

As should be apparent from the above, in the process described in copending application Ser. No. 159,961, now abandoned three scribe coat masters 110, 111, 112 and 113 are formed on the drafting machine, and each has a different thickness line thereon. This involves the use in the drafting machine of different width scribers, one of which is an extremely thin scriber 0.005 inches in width. The use of the thicker or wider scribers, as noted hereinabove, in order to form the scribe coats 111, 112 and 113 has involved certain difficulties. These as described in the introductory portion of this application relate to the fact that when a wide scriber is used, it is extremely difficult to obtain a clear sharp line which is extremely necessary to the formation of the proper dies. This is due to the fact that with a wide scriber, problems of the scribe-coat material not laying flat become acute and there is a tendency for the scriber not to cut deep enough or to cut too deep. When the scriber does not cut deep enough a sharp line is not formed in the scribe-coat material. As shown in FIG. 4, portions designated X of the scribable coating material have not been scribed away and those, as can be seen, project into the area (111, for example). Such a problem can readily occur because of the fact that Scribe Coat material does not lie flat and therefore the scriber does not properly engage with the scribe material. Obviously, with such a scribe material reproduction thereof will result in reproduction of the areas X, as well, and the shaped accurate lands will not be produced.

Figure 5:
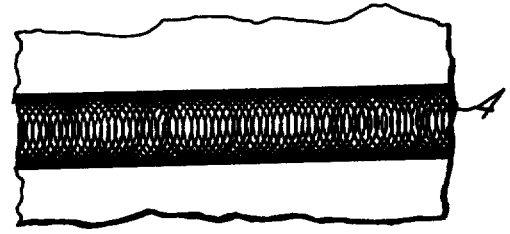

In addition, under certain circumstances, the scriber scribes too deeply and not only removes all of the coating material, but also may mark the mylar base sheet, as shown by scuff lines Y in FIG. 5. When the scriber scribes too deeply and engages the mylar base sheet, the mylar is scarred. When reproduced, a slightly translucent or fuzzy reproduction is provided that greatly affects the negative or positive which is produced from the scribe material, and can thus affect the chemical etching process to make improper lands.

Furthermore, an occasional problem occurs, even though the scribe material is lying flat. When using a wide scriber, the scriber may not engage the material properly, but rather may be skewed to the surface of the scribable material. As a result, one edge of the scriber will dig into the scribe material; whereas the other edge will not remove enough of the scribable coating. As noted above, glass having a scribable coating thereon has been suggested as a solution, but the glass is expensive and creates problems in handling.

The present invention provides a solution to the problems above enumerated in the process which is described above and which is disclosed in detail in application Ser. No. 159,961, now abandoned. By the present invention the computerized drafting machine is used to scribe only very narrow lines, such as line 110 of the scribe material 100. Since a very narrow scriber is then required, the problems of removing too much coating or not enough coating are minimized, as well as the problems resulting from a skewed scriber. In accordance with the present invention, scribers of a width in the order of 0.003 to 0.010 inches are used which reliably provide sharp, accurate-width lines in the scribe material.

In general, the process involves, first, scribing on the computerized drafting machine only the line 110. The scribe-coat masters 111, 112 and 113 are eliminated and through the use of optical techniques and orbital exposure techniques to be described below, the positives 116, 117 and 166 are prepared. Alternatively, and preferably, the formation of the positives 116 and 117 can be eliminated by utilizing the scribe master 100 and forming from that master 100 through orbital exposure techniques the positive 166. Then the master 100 may be accurately replaced on the automatic drafting machine, and the master 100 can then be scribed on the automatic computerized drafting machine to form the scribe master 126 with the lines 120, 110, 121 formed therein.

In the orbital exposure technique for forming either 116, 117 or 166, the scribe-coat master 100 is first scribed to form only line 110 therein. The width of the line, as in the described embodiment, is 0.005 inches but it could be in the range of 0.003 to 0.010 inches. Lines 105–108 are scribed later. The scribe-coat master 100 is then laid in an overlapping relationship with a film and the film is exposed through the scribe-coat master 100, so that the film is exposed through the line 110. During the exposure, the master 100 and film are moved relatively in their own planes and while in contact so that the area exposed is wider than the line 110. This movement can be accomplished in an orbital manner by well-known conventional machines, an example of one such machine being illustrated in U.S. Pat. No. 2,144,066, and another is marketed under the name "Misomex."

Figure 6:
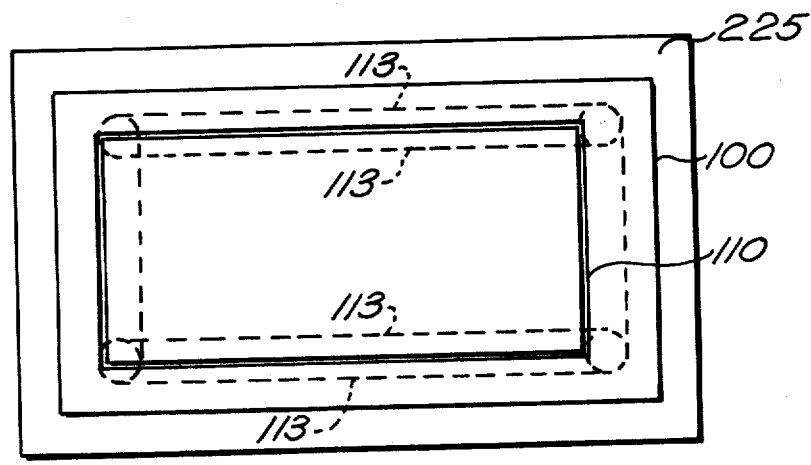
FIG. 6 illustrates schematically the orbital contact exposure technique.

The orbital exposure setup is schematically illustrated in FIG. 6. The scribe-coat master 100 has a line 110 thereon located depending upon the layout of a carton to be made, and the line 110 is depicted as a rectangle in FIG. 6. It should be obvious that a two-dimensional shape is being reproduced and the lines defining that shape are being enlarged by the orbital exposure technique. The scribe-coat master 100 is mounted in a suitable frame overlying a frame carrying film 225 which is in engagement with the scribe-coat 100. The frames form a part of a machine which may effect an orbiting movement of one frame relative to the other while exposure is occurring. In this embodiment, the scribecoat 100 is moved relative to the film 225 in an orbital manner in order to provide an exposed area on the film which corresponds with area 113 of the scribe material 103, and is shown in dotted lines in FIG. 6. The relative positioning as shown in FIG. 6 is the initial positioning of the master 100 and film. The dotted circles in FIG. 6 depict schematically the orbiting movement which results in the exposed wider line 113. That film produced by the orbital technique then corresponds with the positive 166. Positives 116 and 117 can be similarly made from the original thin scribe master 100. This is due to the fact that the machine for orbital exposure of the master 100 is adjustable to increase the width of line 110 to any particular width. After the orbital exposure, the master 100 is replaced on the drafting machine and lines 106–108 are scribed therein. The process is then identical to that described above in connection with FIG. 3.

As noted above, the orbital exposure technique can be utilized to make only master 103 from master 100. With proper registry on the drafting machine, after master 100 is used for making positive 166, it can be replaced on the drafting machine. Lines corresponding with 120, 121, 130, 132, and 133 can then be scribed therein by the drafting machine, thereby forming a negative line 126, which can then be used with positive 166 in the making of the dies. This, of course, eliminates the need for positives 116 and 117, and is preferable.

While the above technique of orbitally exposing a scribe coat is used to form a positive having a larger line which then is used in the formation of the cooperating dies, the orbital exposure technique can also be used in the formation of a single die which may cooperate with a solid cylinder member. The problem of side etching in such a process in order to form a proper thickness die or land is the same as that described in connection with FIG. 3. In such a process a very narrow cutting land of the order to 0.005 inches could be formed in a scribe-coat master. That scribe-coat master could then be orbitally exposed, as described above, in order to increase the thickness of the scribed line. The positive which is formed through the orbital exposure technique can then be transferred into a negative, and then a metal plate with resist coating can then be exposed through the negative. When the etchant is applied, the areas that have been treated with the light will not be etched away and the remaining areas will. As a result, the land will be formed and due to the fact that there is side etching of the material, a proper thickness land will be formed.

While certain embodiments described above contemplate the scribing of score lines in the master after the orbital exposure, it is also contemplated that the master could be stored. This would necessitate scribing a new master corresponding to 100. The stored master could be later used and orbited differently for making dies for different thickness stock or for remaking the same dies where different chemicals having different etching capability may be used.

It should be apparent from the above that applicant has provided a new and improved technique for forming die plates and that the technique can be applied to a large number of different die constructions, as well as to different die-forming techniques.

Having described the specific embodiment of the invention, the following is claimed:

1. The method of providing a parallel-sided and longitudinally extending linear land on the surface of a chemically-etchable homogeneous metallic member wherein the areas on each side of the land are to be etched downwardly and to a depth which inherently results in side-etching including the steps of:
   providing said metallic member with a planar surface,
   providing a thin transparent backing sheet with an opaque scribable surface thereon,
   scribing a longitudinally extending linear line of a first width in said scribable surface with a scribing tool to produce a first transparency,
   placing said scribed transparency in contact with an unexposed film sheet and exposing said film sheet while moving said first transparency and film sheet relative to each other to produce a second transparency having a linear and longitudinally extending exposed area with a width which is greater than said first width and the width of the linear land to compensate for side-etching which results from achieving the desired etching depth below the surface of said metallic member,
   providing said planar surface with a light-hardenable sensitized coating material,
   exposing to light those areas of said coating corresponding with said exposed areas of said second transparency to harden those areas of said coating,
   removing the unhardened coating material from said surface, and
   chemically etching said member.

2. In a method of making a pair of dies each having lands thereon which project from a main body of the die and which form material, the steps of:
   providing a pattern corresponding to the shape of the material to be formed by the dies,
   providing a first film having a light-transmitting base sheet with a removable coating thereon,
   engaging the film with a narrow tool for removing the coating from the base sheet,
   moving the tool in a path in dependence upon the pattern to remove the coating to a width of the tool in a smooth uniform thin line thereby providing a first transparency having a thin light-transmitting line and a relatively opaque background,
   positioning said first transparency in contact with a film,
   orbiting said first transparency and film relative to each other while directing light through said thin line onto the film to provide a second transparency having an exposed line with a width greater than the width of said thin line,
   coating a metal plate with a light-hardenable resist,
   exposing the resist coating in accordance through at least a part of said second transparency to harden an area of the resist, and
   etching the metal plate in the unhardened areas.

3. The method defined in claim 1 wherein said second transparency comprises a positive with said exposed areas being non-light transmitting, making a negative from said positive which negative has light transmitting areas corresponding to said exposed areas, placing said negative in contact with said planar surface and exposing said coating to light therethrough.

4. The method of claim 1 wherein said thin line has a width of 0.003 inch to 0.010 inch and defines a two dimensional shape.

5. The method defined in claim 1 wherein said exposed area of said second transparency has first and second boundaries defining the area therebetween, at least one of said boundaries being located a precise distance from the boundary of the land to be formed, which distance is equal to the distance through which side etching would occur during the etching step.

6. In a method as defined in claim 2 further including the steps of forming from said first negative a full size second transparency by stepping said first negative a plurality of times and exposing same, said second transparency corresponding with the die to be made, and said exposing step is performed by exposing said resist through said second transparency.

7. In a method of making a pair of dies each having lands thereon which project from a main body of the die and which form material, the steps of:

providing a pattern corresponding to the shape of the material to be formed by the dies, providing a first film having a light-transmitting base sheet with a removable coating thereon, engaging the film with a narrow tool for removing the coating from the base sheet, moving the tool in a path in dependence upon the pattern to remove the coating to a width of the tool in a smooth uniform thin line thereby providing a first transparency having a thin light-transmitting line and a relatively opaque background, positioning said first transparency in contact with a film, orbiting said first transparency and film relative to each other while directing light through said thin line onto the film to provide a second transparency having an exposed line with a width greater than the width of said thin line, coating a metal plate with a light-hardenable resist, exposing the resist coating in accordance through at least a part of said second transparency to harden an area of the resist, etching the metal plate in the unhardened areas, scribing additional smooth uniform lines in said first transparency after performing said orbiting step to form a line layout including at least three lines having two areas therebetween, exposing a sensitizible peelable film on a light-transmitting base sheet through said first transparency to define two peelable areas corresponding to the areas between the lines on said first transparency, peeling at least one of said areas, combining said second transparency and said peeled film to form a negative having a light-transmitting area corresponding in part with said peeled area and in part with said exposed line in said second transparency, and exposing said resist coating through said negative.

8. The method defined in claim 7 wherein said second transparency comprises a positive with said exposed areas being non-light transmitting, making a negative from said positive which negative has light transmitting areas corresponding to said exposed areas, placing said negative in contact with said planar surface and exposing said coating to light therethrough.

9. The method of claim 7 wherein said thin line has a width of 0.003 inch to 0.010 inch and defines a two dimensional shape.

10. The method defined in claim 7 wherein said exposed area of said second transparency has first and second boundaries defining the area therebetween, at least one of said boundaries being located a precise distance from the boundary of the land to be formed, which distance is equal to the distance through which side etching which would occur during the etching step.

11. In a method as defined in claim 7 further including the steps of forming from said first negative a full size second transparency by stepping said first negative a plurality of times and exposing same, said second transparency corresponding with the die to be made, and said exposing step is performed by exposing said resist through said second transparency.

* * * * *